United States Patent
Mizuno et al.

(10) Patent No.: US 11,221,986 B2
(45) Date of Patent: Jan. 11, 2022

(54) DATA MANAGEMENT METHOD AND DATA ANALYSIS SYSTEM

(71) Applicant: Hitachi, Ltd., Tokyo (JP)

(72) Inventors: Jun Mizuno, Tokyo (JP); Yuichi Taguchi, Tokyo (JP); Soichi Takashige, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 407 days.

(21) Appl. No.: 16/332,775

(22) PCT Filed: May 31, 2017

(86) PCT No.: PCT/JP2017/020323
§ 371 (c)(1),
(2) Date: Mar. 12, 2019

(87) PCT Pub. No.: WO2018/220763
PCT Pub. Date: Dec. 6, 2018

(65) Prior Publication Data
US 2019/0361844 A1 Nov. 28, 2019

(51) Int. Cl.
*G06F 16/16* (2019.01)
*G06F 16/22* (2019.01)
(Continued)

(52) U.S. Cl.
CPC .......... *G06F 16/162* (2019.01); *G06F 9/3005* (2013.01); *G06F 9/4843* (2013.01); *G06F 16/221* (2019.01); *G06F 16/24564* (2019.01)

(58) Field of Classification Search
CPC ................. G06F 16/162; G06F 16/221; G06F 16/24564; G06F 9/3005; G06F 9/4843; G06F 21/60; G06F 21/62
See application file for complete search history.

(56) References Cited

U.S. PATENT DOCUMENTS

2006/0123461 A1   6/2006   Lunt et al.
2010/0318492 A1*  12/2010  Utsugi ............... G06F 16/20
                                                707/603
(Continued)

FOREIGN PATENT DOCUMENTS

JP   2014-211607 A   11/2014
JP   2017-091185 A    5/2017
WO   2014/050027 A1   4/2014

OTHER PUBLICATIONS

Yuan et al—A cost effective strategy for intermediate data storage in scientific cloud workflow systems, 2010 IEEE International Symposium on Parallel & Distributed Processing (IPDPS), Apr. 19, 2010. (Year: 2010).*

(Continued)

*Primary Examiner* — Lewis A Bullock, Jr.
*Assistant Examiner* — Kevin X Lu
(74) *Attorney, Agent, or Firm* — Procopio, Cory, Hargreaves & Savitch LLP

(57) ABSTRACT

Provided is a data management method capable of deleting intermediate data at an appropriate timing. The data management method in a data analysis system that performs analysis by combining a plurality of input data based on an analysis execution request from a computer includes: a first step, in which a request analysis unit analyzes the analysis execution request from the computer to identify a task, identifies intermediate data generated after execution of each identified task, and generates constraint information that determines whether to delete the identified intermediate data; a second step, in which a task management unit determines whether to delete the intermediate data based on the constraint information for each identified task; and a third step, in which a task execution unit executes the (Continued)

identified task and deletes the intermediate data of the task based on a determination result of the second step.

8 Claims, 17 Drawing Sheets

(51) Int. Cl.
    *G06F 16/2455*      (2019.01)
    *G06F 9/30*      (2018.01)
    *G06F 9/48*      (2006.01)

(56)      References Cited

U.S. PATENT DOCUMENTS

2012/0029975 A1*   2/2012   Bisel .................. G06Q 10/06
                                                        705/7.37
2014/0325592 A1    10/2014   Umetani et al.
2018/0253440 A1*   9/2018   Levesque ............ G06F 16/162

OTHER PUBLICATIONS

Ramakrishnan et al—Scheduling Data-IntensiveWorkflows onto Storage-Constrained Distributed Resources, 2007 International Symposium on Cluster Computing and the Grid, May 14, 2007 (Year: 2007).*

International Search Report for related International Application No. PCT/JP2017/020323, dated Sep. 5, 2017; English translation provided; 6 pages.

* cited by examiner

[FIG. 1]
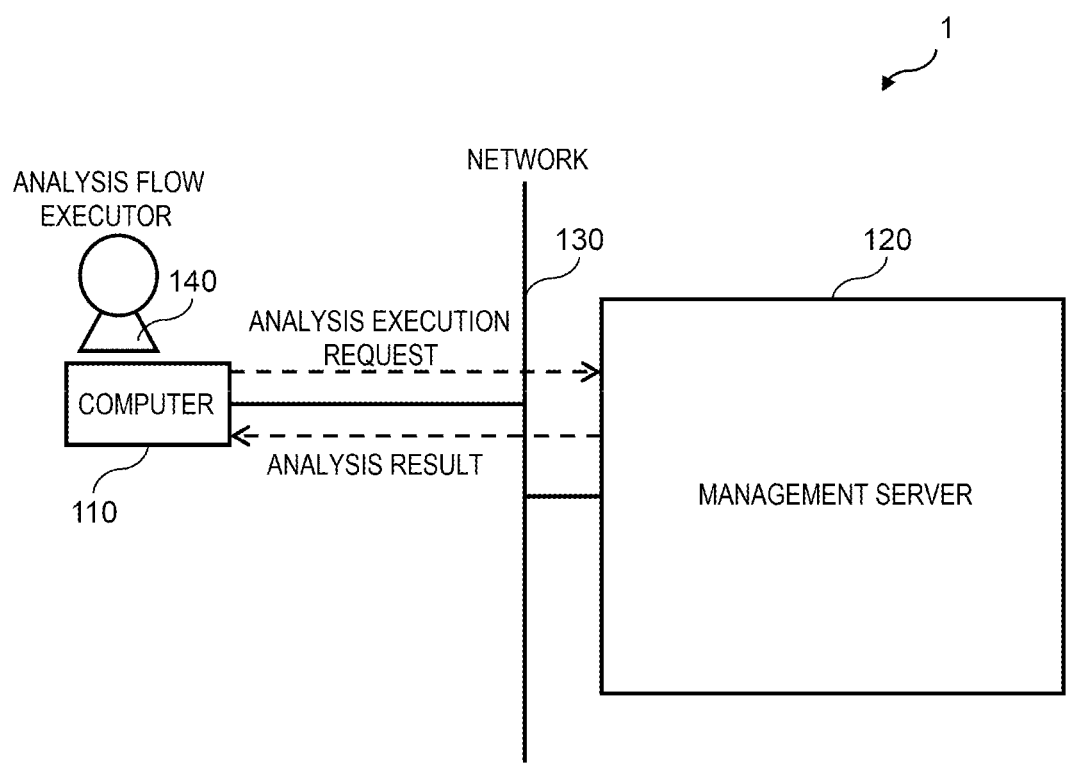

[FIG. 2]
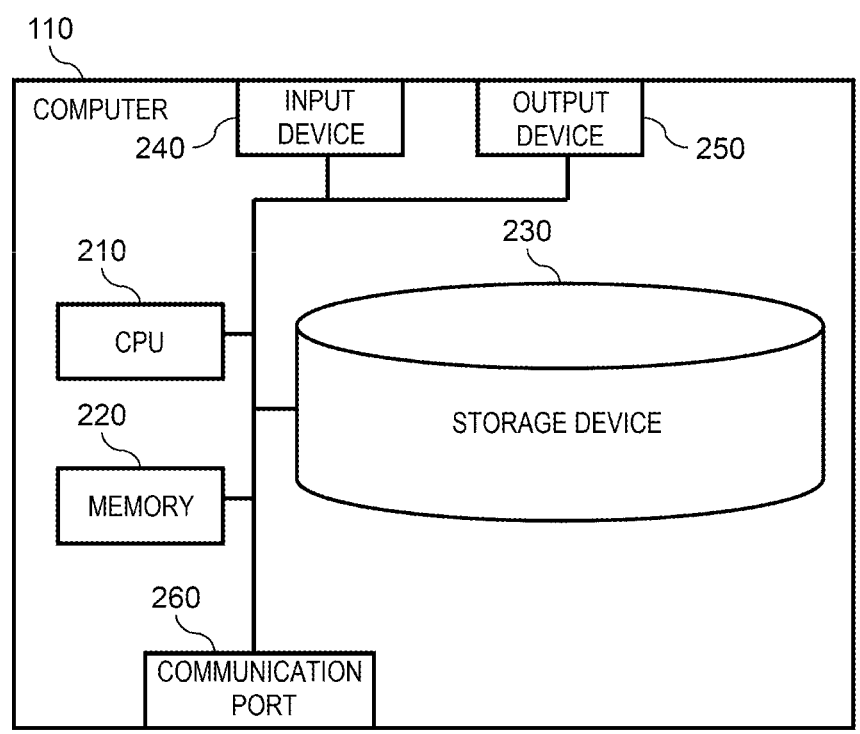

[FIG. 3]
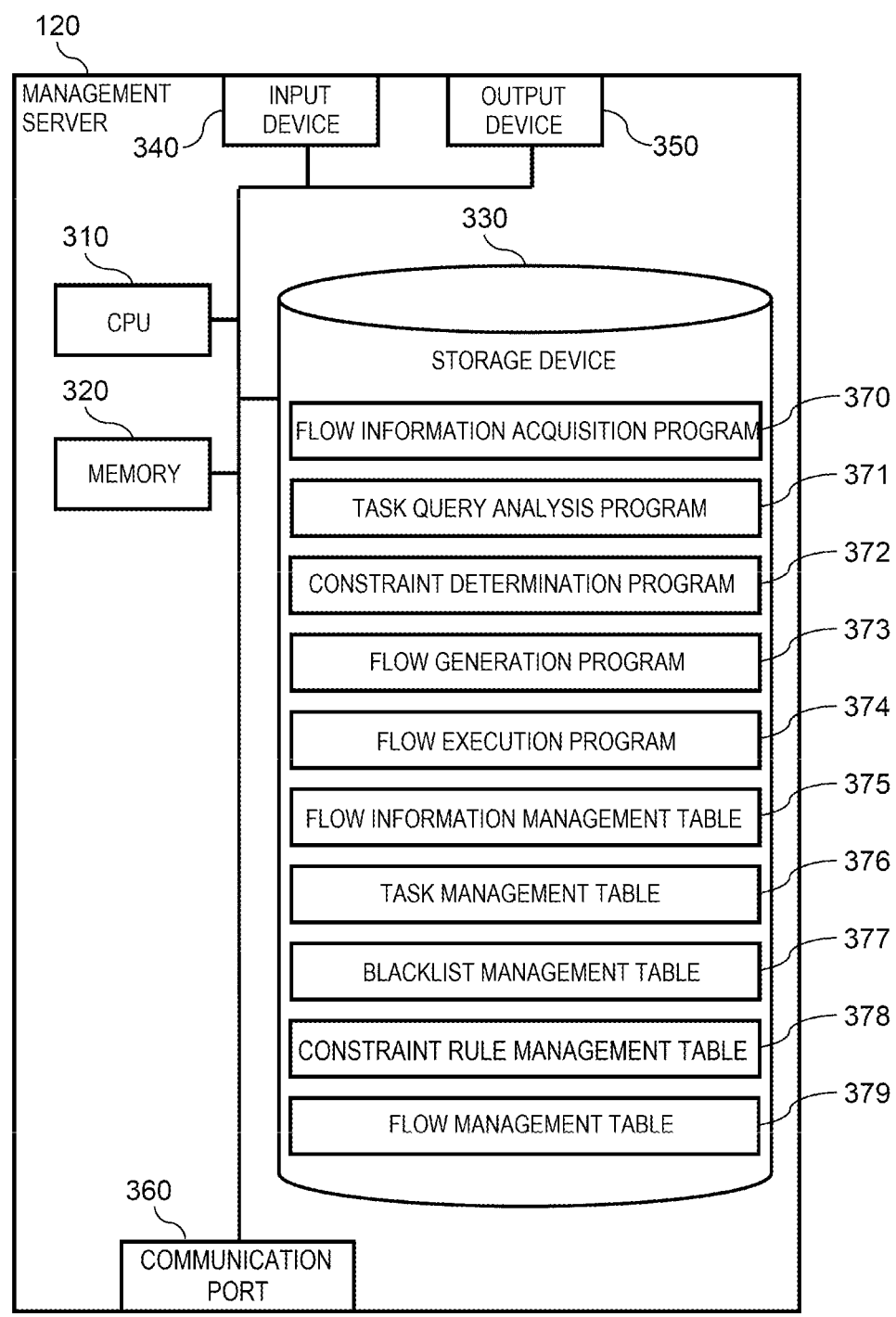

[FIG. 4]

FLOW INFORMATION MANAGEMENT TABLE 375

| TASK ID | INPUT SOURCE | INPUT DATA | QUERY |
|---|---|---|---|
| TASK 1 | COMPANY_A | ID, GENDER, AGE, PURCHASED_ARTICLE | create table intermediate_data1 as selected id, company_A. gender, company_A. age, company_A. purchased article, company_B. order from company_A inner join company_B on company_A. id=company_B. id; |
| | COMPANY_B | ID, ORDER | |
| TASK 2 | | | create table intermediate_data2 as select id, company_A. purchased article, company_B. order form intermediate_data1 where gender=female and age=30; |
| TASK 3 | | | create table intermediate_data3 as select count(*) from intermediate_data2; |

TASK MANAGEMENT TABLE 376

| TASK ID | INPUT SOURCE | INPUT DATA | INTERMEDIATE DATA | INTERMEDIATE DATA ID |
|---|---|---|---|---|
| TASK 1 | COMPANY_A | ID, GENDER, AGE, PURCHASED_ARTICLE | ID, GENDER, AGE, PURCHASED_ARTICLE, ORDER | INTERMEDIATE_DATA1 |
| | COMPANY_B | ID, ORDER | | |
| TASK 2 | INTERMEDIATE_DATA1 | ID, GENDER, AGE, PURCHASED_ARTICLE, ORDER | ID, PURCHASED_ARTICLE, ORDER | INTERMEDIATE_DATA2 |
| TASK 3 | INTERMEDIATE_DATA2 | ID, PURCHASED_ARTICLE, ORDER | COUNT(*) | INTERMEDIATE_DATA3 |

BLACKLIST MANAGEMENT TABLE 377

| ID | ARRIBUTE |
|---|---|
| 1 | NAME |
| 2 | ADDRESS |
| 3 | ID |

CONSTRAINT RULE MANAGEMENT TABLE 378

| INTERMEDIATE DATA ID | COUNTERMEASURE |
|---|---|
| INTERMEDIATE_DATA 1 | DELETE |
| INTERMEDIATE_DATA 2 | DELETE |
| INTERMEDIATE_DATA 3 | LEAVE |

710 720

[FIG. 8]
FLOW MANAGEMENT TABLE 379
| ID | TASK |
|---|---|
| 1 | TASK 1 |
| 2 | TASK 2 |
| 3 | DELETE INTERMEDIATE DATA 1 |
| 4 | TASK 3 |
| 5 | DELETE ALL INTERMEDIATE DATA |
810  820
[FIG. 9]
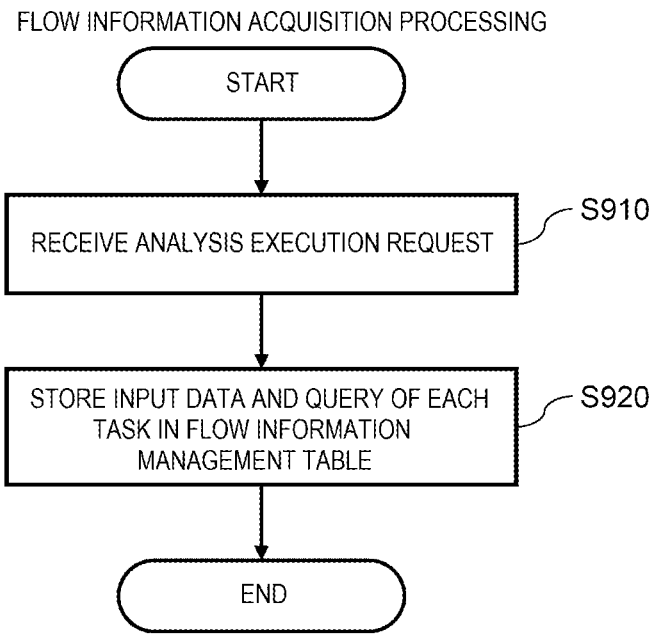
FLOW INFORMATION ACQUISITION PROCESSING

[FIG. 10]
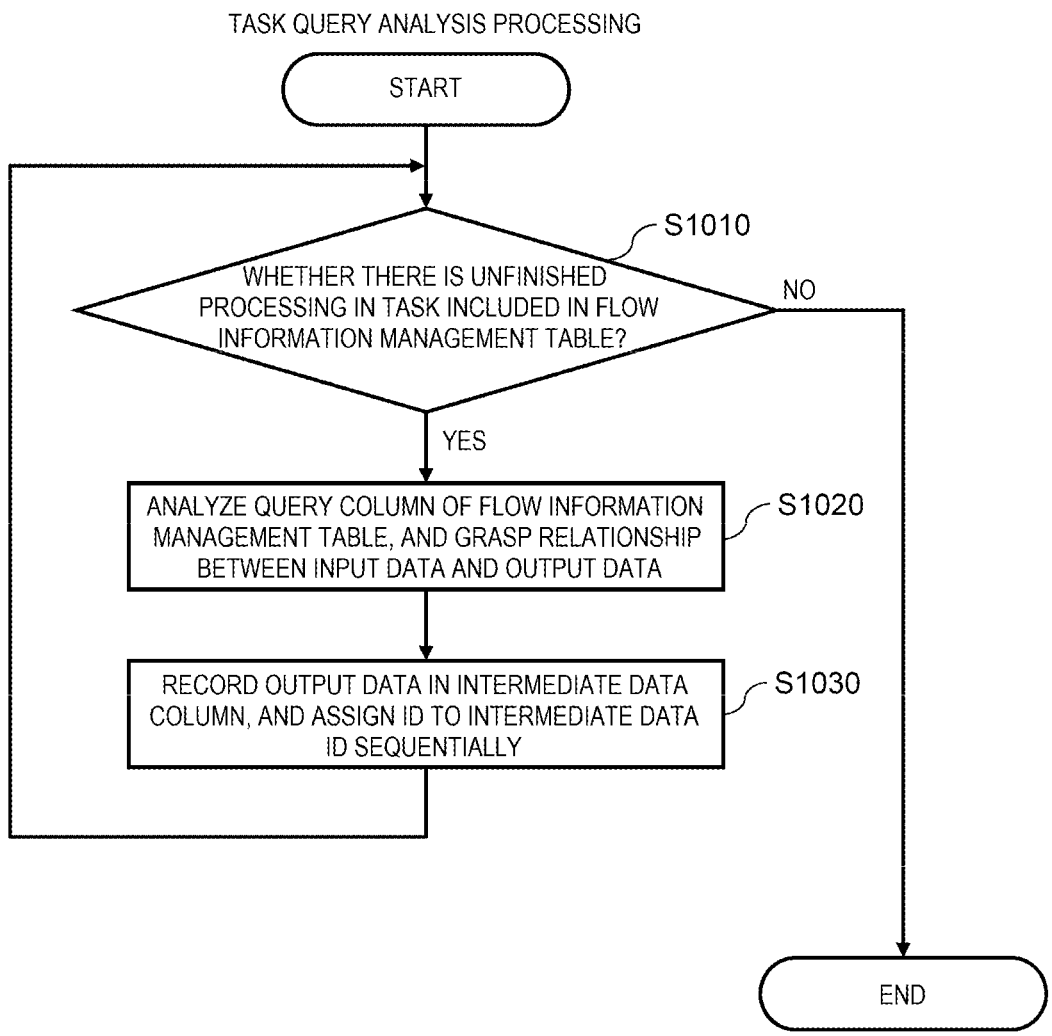

[FIG. 11]
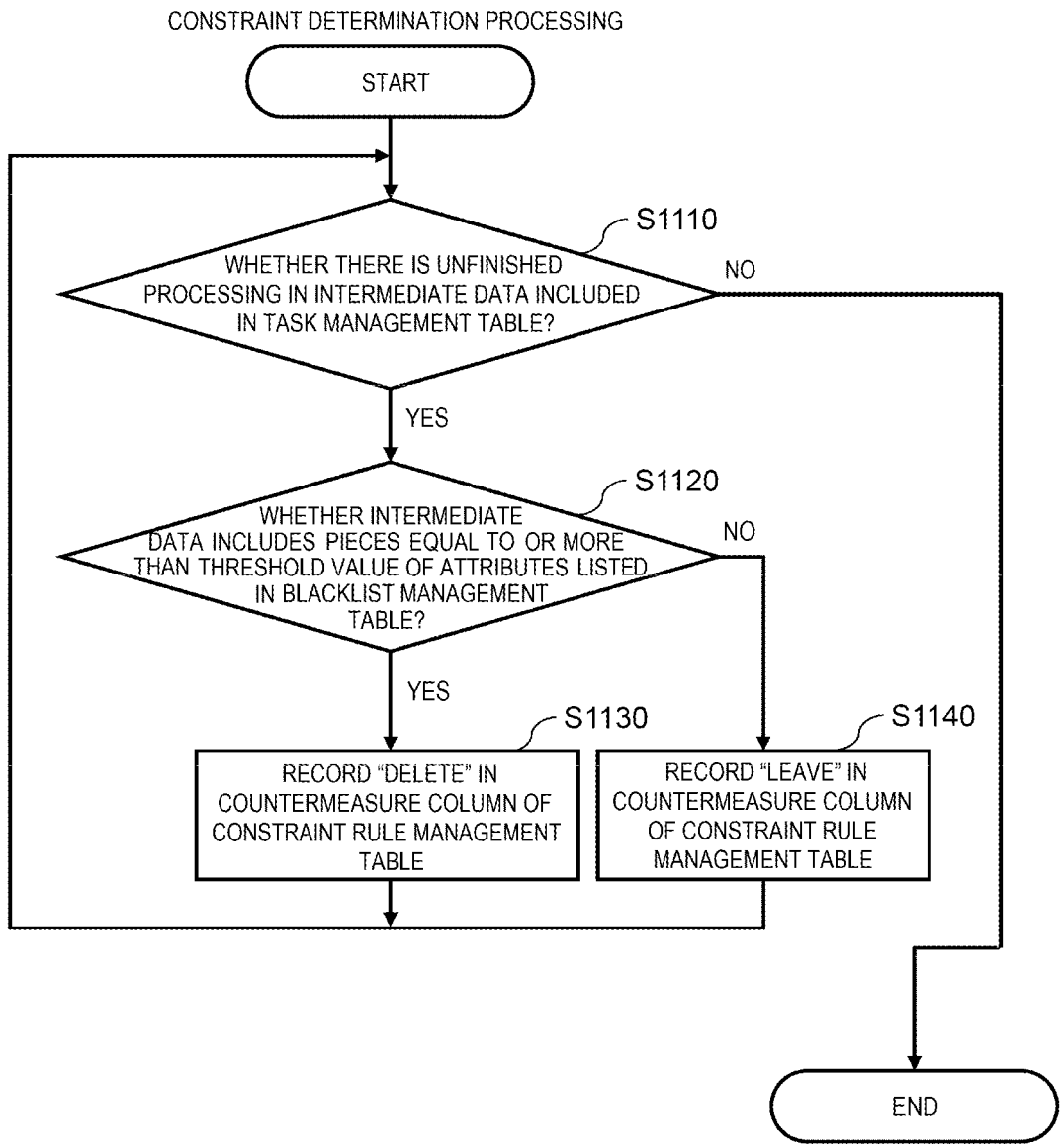

[FIG. 12]
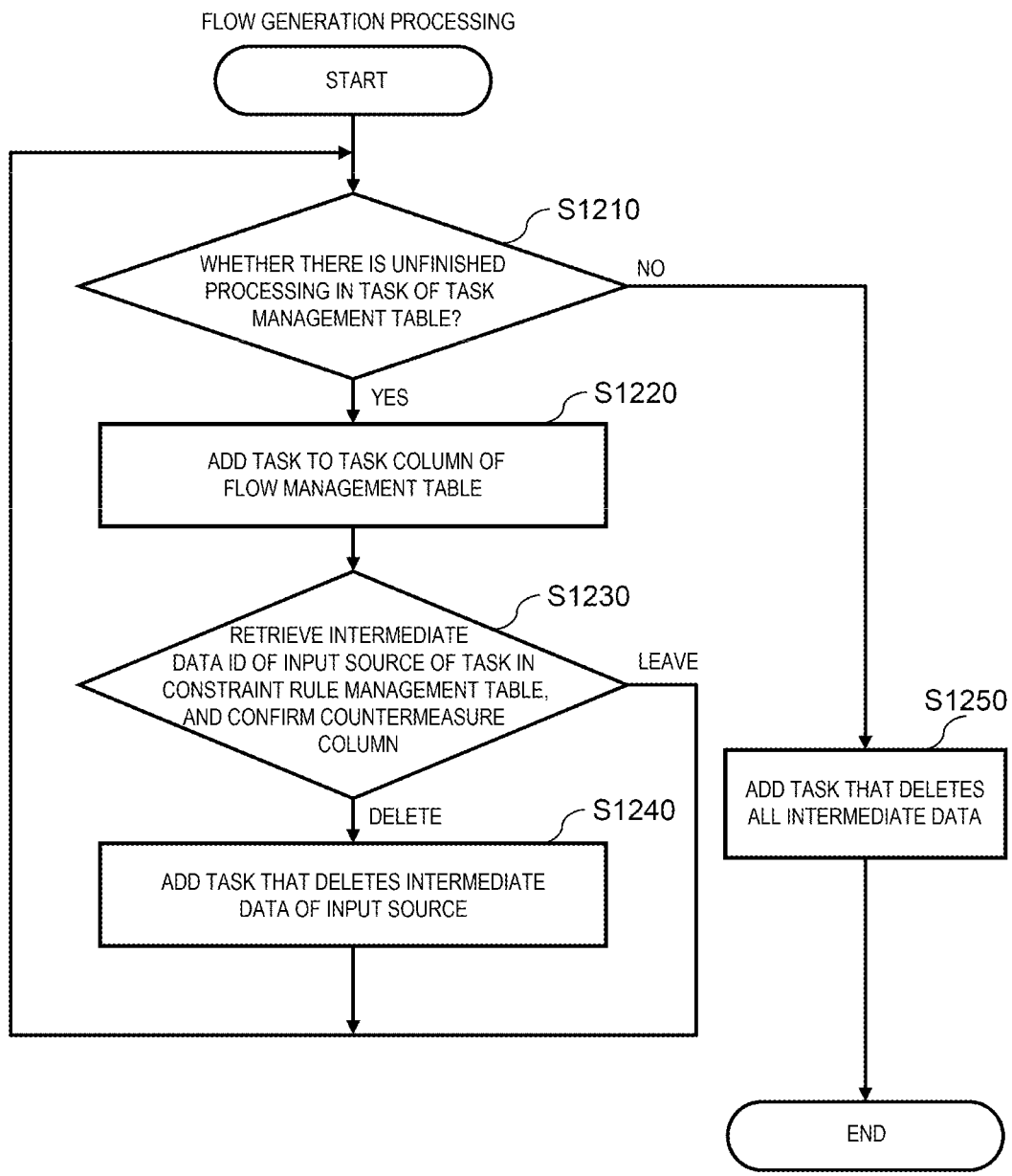

[FIG. 13]
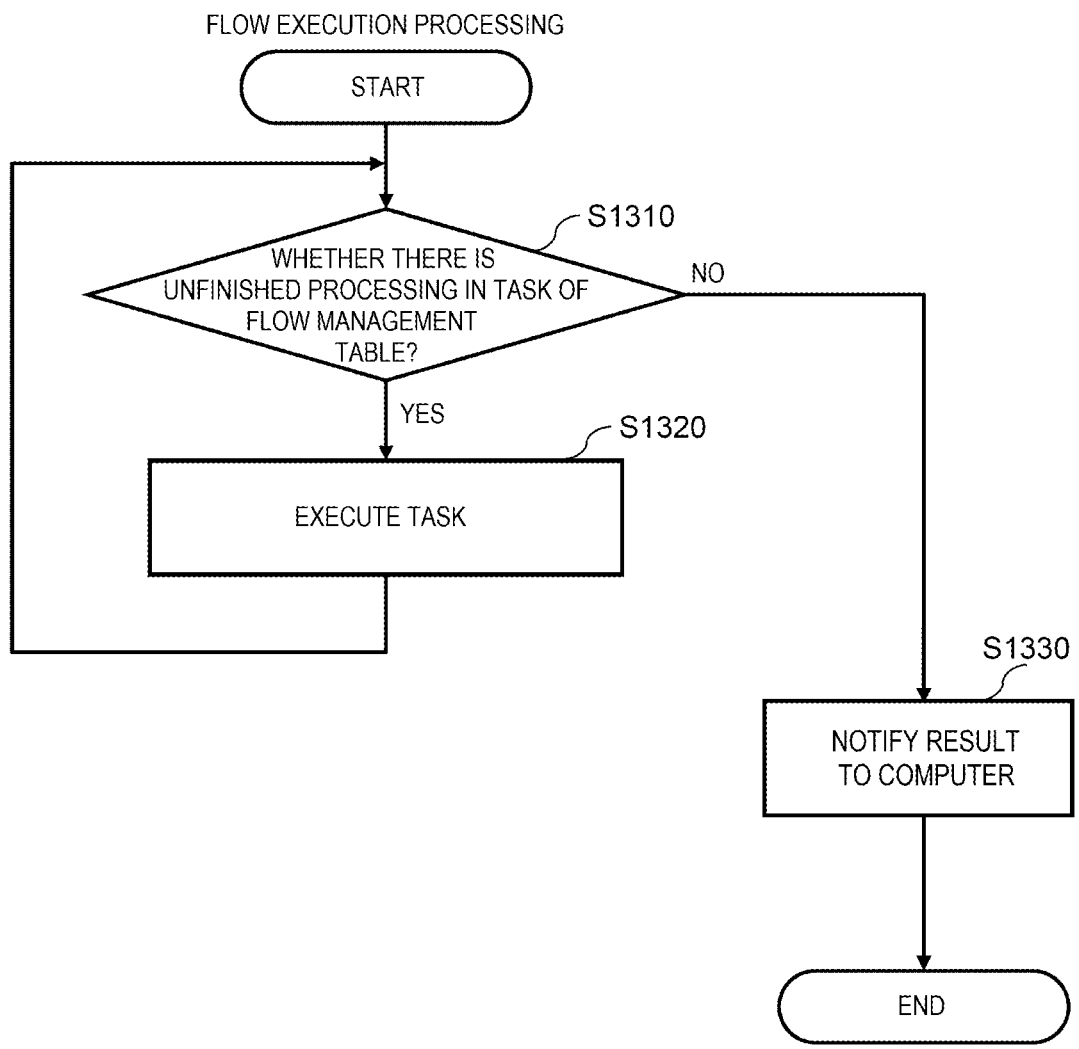

[FIG. 14]
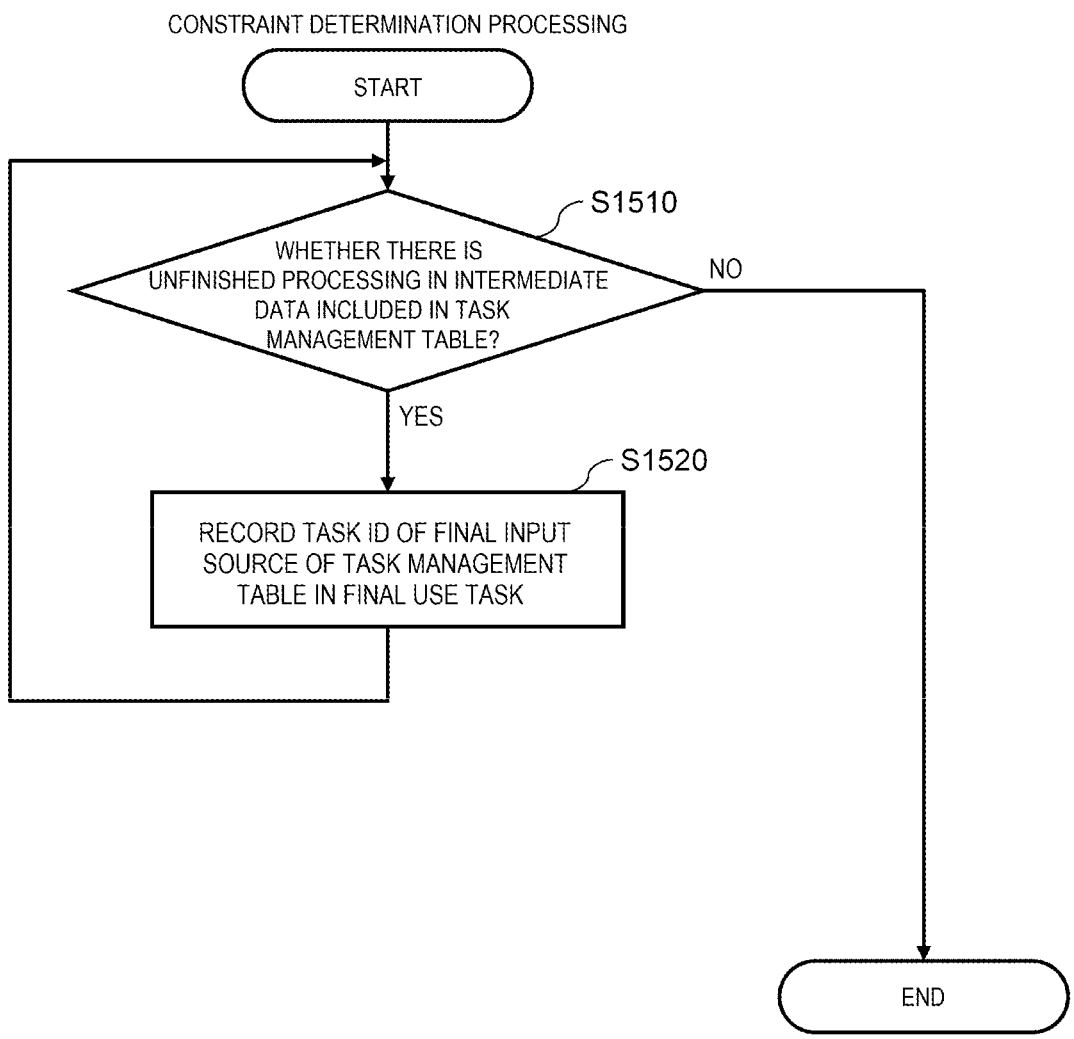
[FIG. 15]

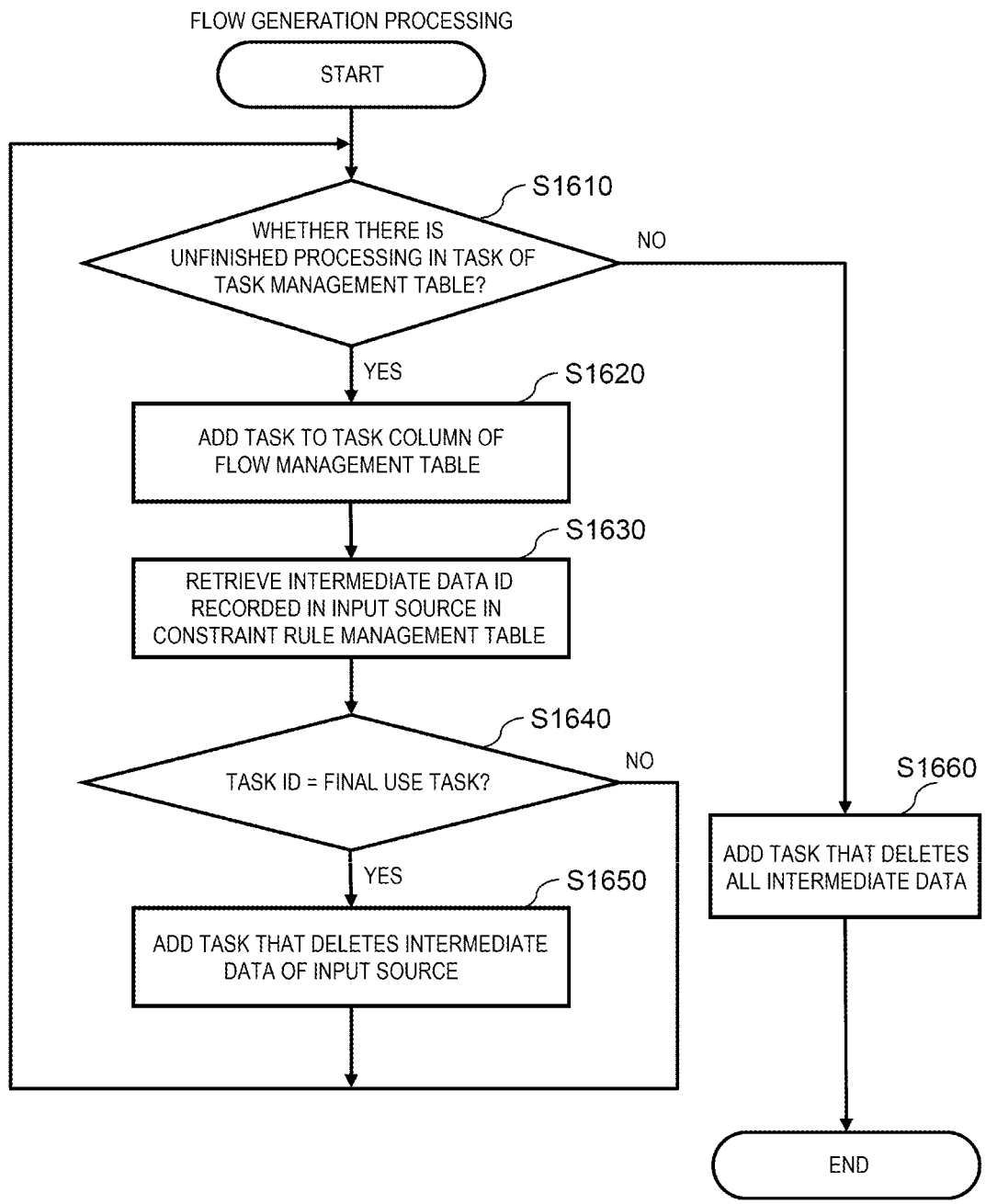
[FIG. 16]

[FIG. 17]

CONSTRAINT RULE MANAGEMENT TABLE  378

| INTERMEDIATE DATA ID | GENERATION TIME (MINUTE) | COUNTERMEASURE |
|---|---|---|
| INTERMEDIATE_DATA 1 | 60 | LEAVE |
| INTERMEDIATE_DATA 2 | 2 | DELETE |
| INTERMEDIATE_DATA 3 | 2 | DELETE |

INTERMEDIATE DATA GENERATION TIME
THRESHOLD VALUE MANAGEMENT TABLE  1800

| THRESHOLD VALUE (MINUTE) |
|---|
| 5 |

TASK EXECUTION TIME MANAGEMENT TABLE                    1900

| ID | EXECUTION TIME (MINUTE) | QUERY |
|---|---|---|
| 1 | 60 | create table intermediate_data1 as select id, company_A. gender, company_A.age, company_A. purchased_article, company_B. order from company_A inner join company_B on company_A. id=company_B. id; |
| 2 | 2 | create table intermediate_data2 as select id, company_A. purchased_article, company_B. order from intermediate_ data1 where gender=female and age=30; |
| 3 | 2 | create table intermediate_data3 as select count(*) from intermediate_data2; |

1910  1920  1930

[FIG. 20]
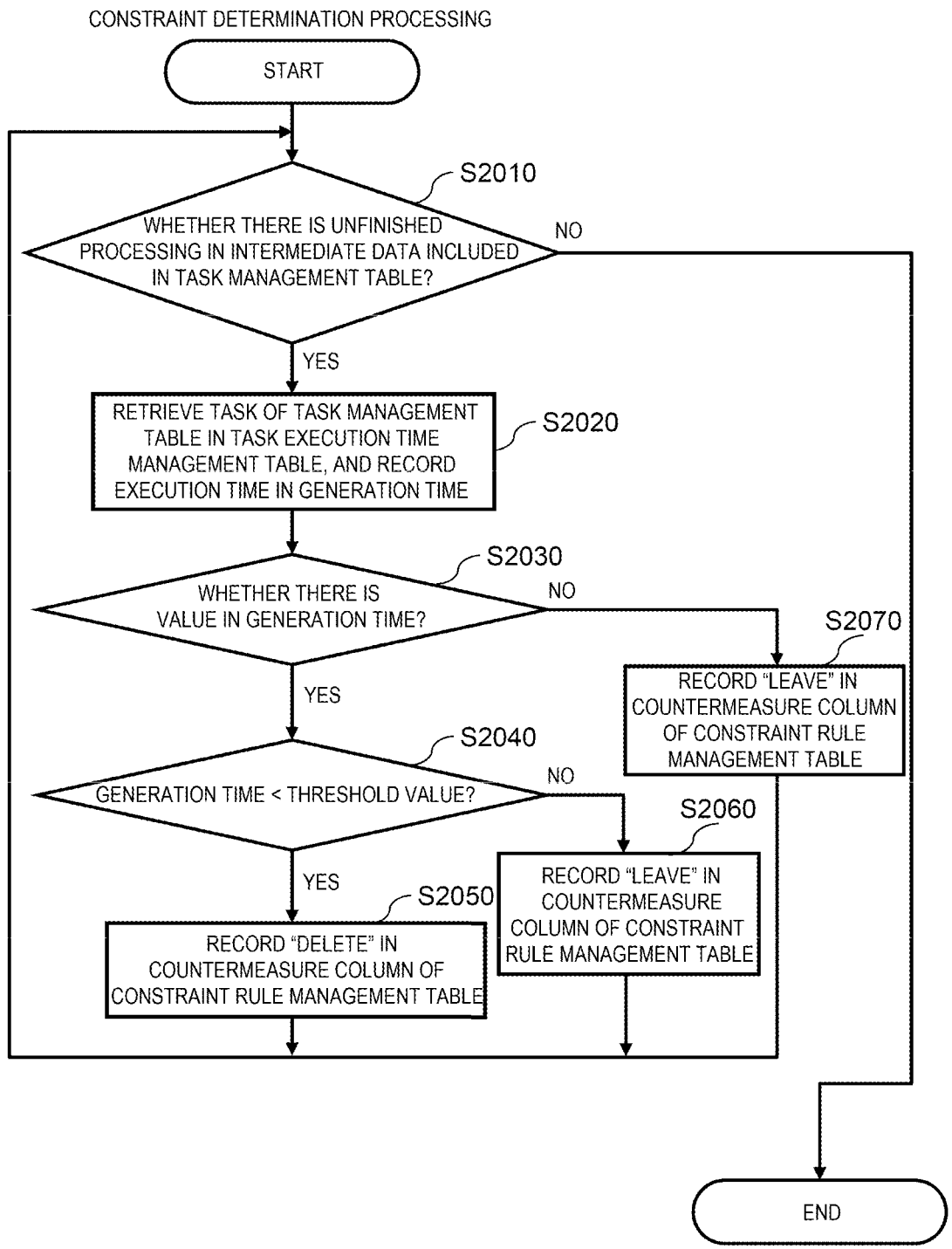

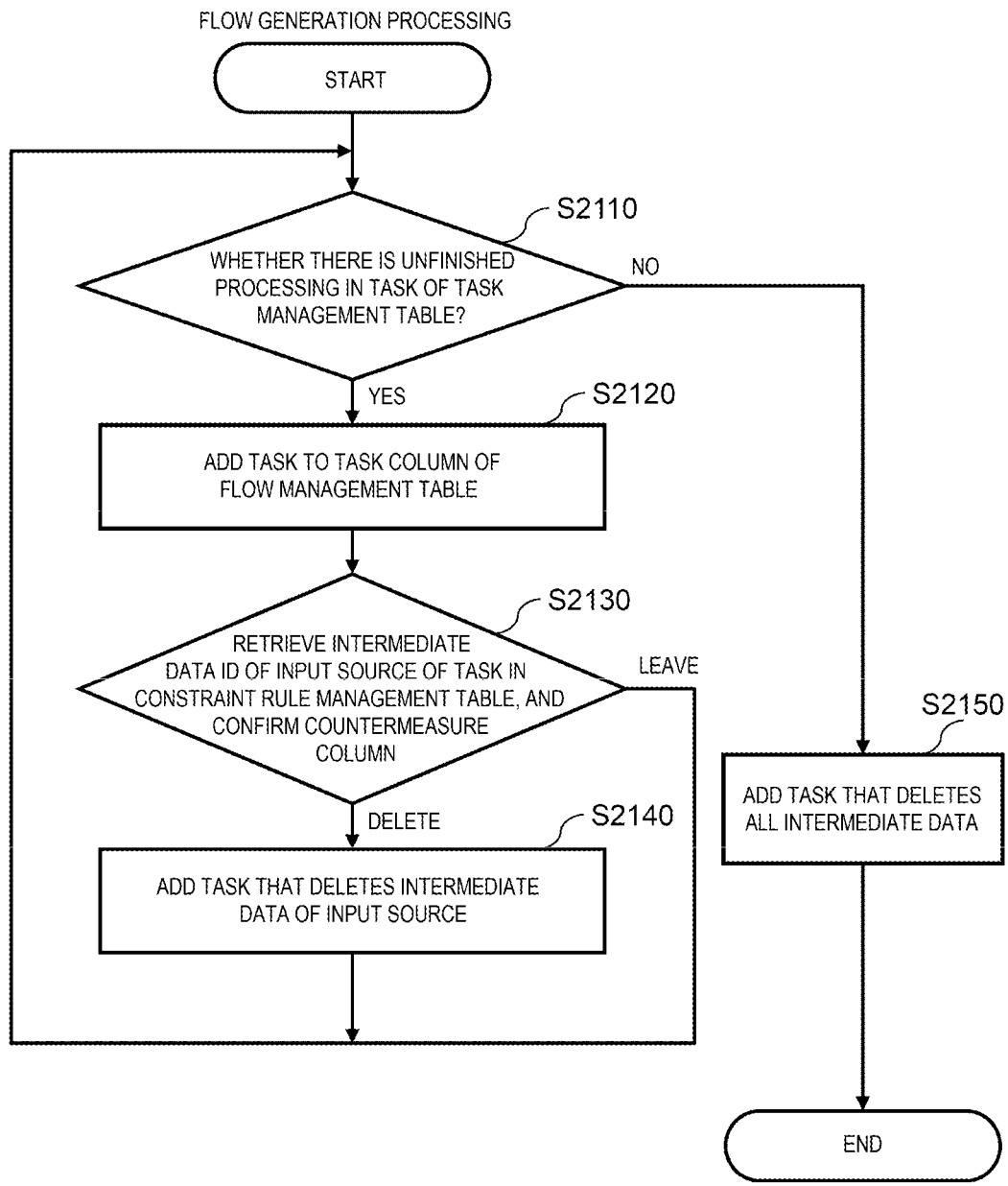
[FIG. 21]

[FIG. 22]
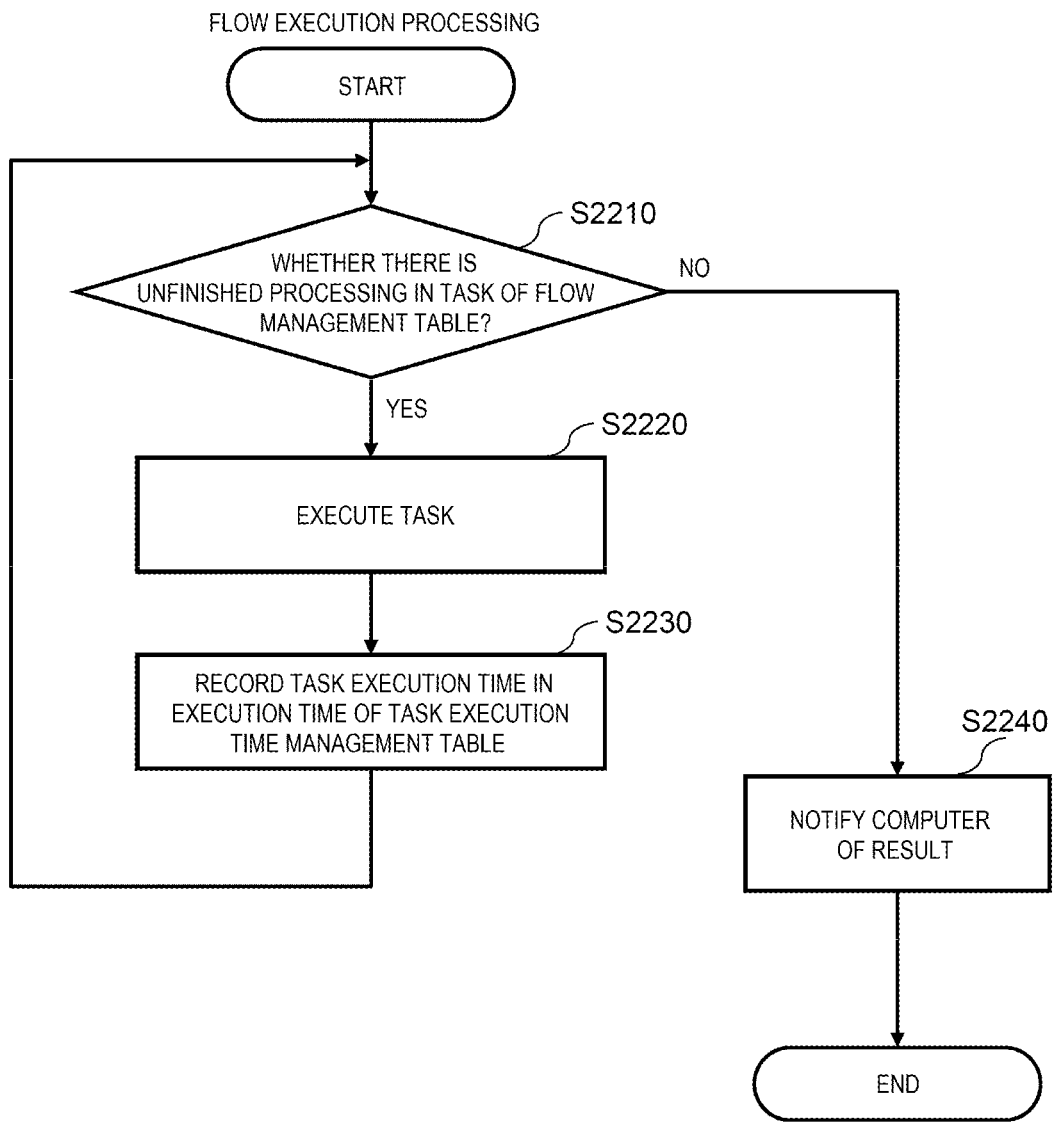

DATA MANAGEMENT METHOD AND DATA ANALYSIS SYSTEM

TECHNICAL FIELD

The present invention relates to a data management method and a data analysis system, and is suitable for use, for example, in a data analysis system that performs analysis by combining a plurality of input data.

BACKGROUND ART

Any inter-enterprise data exchange is currently an exchange of open data since it is difficult to make a data security contract. Meanwhile, creation of a contract template for the inter-enterprise data exchange has proceeded in a data exchange consortium. It is considered that data exchanges will be performed with security contracts for any inter-enterprise data exchange in future.

In addition, data obtained by the data exchange is analyzed by an analysis flow configured by a plurality of tasks (batch processing). In general, intermediate data is left until the analysis flow ends and deleted when the analysis flow ends for quick re-execution at the time of a task failure in the batch processing.

Meanwhile, it is conceivable that data held by a plurality of companies is combined and analyzed by data exchange. At this time, intermediate data generated by combining the data of the plurality of companies may have a high security risk with respect to each of the input data, for example, an individual can be specified by a combination of the data.

In this respect, a technique is disclosed in which a security level is determined by an attribute of input data, and processing is changed in accordance with necessity of data concealment (see Patent Literature 1).

PRIOR ART LITERATURE

Patent Literature

PTL 1: JP-A-2014-211607

SUMMARY OF INVENTION

Technical Problem

In the technique described in Patent Literature 1, there is a problem that it is impossible to cope with a change in the security risk caused by data coupling or the like performed by each task, since a security risk is determined by the attribute of the input data at a beginning of a flow.

On the other hand, data with high security risk is deleted immediately after use, and data with low security risk is left until an end of the flow, so it is impossible to cope with a fluctuating security risk and to perform quick re-execution at the time of a task failure.

However, it is difficult to determine a level of a dynamically changing security risk, so there is a problem that it cannot be determined whether intermediate data should be deleted.

The invention is made in view of the above circumstances. An object of the invention is to propose a data management method capable of deleting intermediate data at an appropriate timing.

Solution to Problem

In order to solve the above problems, the invention provides a data management method in a data analysis system that performs analysis by combining a plurality of input data based on an analysis execution request from a computer. The data management method includes: a first step, in which a request analysis unit analyzes the analysis execution request from the computer to identify a task, identifies intermediate data generated after execution of each identified task, and generates constraint information that determines whether to delete the identified intermediate data; a second step, in which a task management unit determines whether to delete the intermediate data based on the constraint information for each identified task; and a third step, in which a task execution unit executes the identified task and deletes the intermediate data of the task based on a determination result of the second step.

In addition, the invention provides a data analysis system that performs analysis by combining a plurality of input data based on an analysis execution request from a computer. The data analysis system includes: a request analysis unit, which analyzes the analysis execution request from the computer to identify a task, identifies intermediate data generated after execution of each identified task, and generates constraint information that determines whether to delete the identified intermediate data; a task management unit, which determines whether to delete the intermediate data based on the constraint information for each identified task; and a task execution unit, which executes the identified task and deletes the intermediate data of the task based on a determination result of the task management unit.

In the above configuration, the analysis execution request is analyzed, the constraint information that determines whether to delete the intermediate data is generated, and the intermediate data is deleted based on the constraint information.

Advantageous Effect

According to the invention, a data management method is achieved, which can delete intermediate data at an appropriate timing.

BRIEF DESCRIPTION OF DRAWINGS

FIG. 1 shows an example of a configuration of a data analysis system according to a first embodiment.

FIG. 2 shows an example of a configuration of a computer according to the first embodiment.

FIG. 3 shows an example of a configuration of a management server according to the first embodiment.

FIG. 4 shows an example of a flow information management table according to the first embodiment.

FIG. 5 shows an example of a task management table according to the first embodiment.

FIG. 6 shows an example of a blacklist management table according to the first embodiment.

FIG. 7 shows an example of a constraint rule management table according to the first embodiment.

FIG. 8 shows an example of a flow management table according to the first embodiment.

FIG. 9 shows an example of a flow chart of a flow information acquisition processing according to the first embodiment.

FIG. 10 shows an example of a flow chart of a task query analysis processing according to the first embodiment.

FIG. 11 shows an example of a flow chart of a constraint determination processing according to the first embodiment.

FIG. 12 shows an example of a flow chart of a flow generation processing according to the first embodiment.

FIG. 13 shows an example of a flow chart of a flow execution processing according to the first embodiment.

FIG. 14 shows an example of a constraint rule management table according to a second embodiment.

FIG. 15 shows an example of a flow chart of a constraint determination processing according to the second embodiment.

FIG. 16 shows an example of a flow chart of a flow generation processing according to the second embodiment.

FIG. 17 shows an example of a constraint rule management table according to a third embodiment.

FIG. 18 shows an example of an intermediate data generation time threshold value management table according to the third embodiment.

FIG. 19 shows an example of a task execution time management table according to the third embodiment.

FIG. 20 shows an example of a flow chart of a constraint determination processing according to the third embodiment.

FIG. 21 shows an example of a flow chart of a flow generation processing according to the third embodiment.

FIG. 22 shows an example of a flow chart of a flow execution processing according to the third embodiment.

DESCRIPTION OF EMBODIMENTS

Hereinafter, one embodiment of the invention is described in detail with reference to the drawings.

(1) First Embodiment (Configuration of Data Analysis System)

In FIG. 1, 1 shows a data analysis system according to a first embodiment as a whole. The data analysis system 1 includes at least one computer 110 and at least one management server 120, which are connected to each other via a network 130. An analysis flow executor 140 transmits an analysis execution request related to input data to the management server 120 using the computer 110, and obtains an analysis result (output data) as a response thereof. In the data analysis system 1, intermediate data, which may have higher security risk than the input data due to combination of the input data, can be safely managed in a generation process of the output data. Details will be described below.

FIG. 2 shows an example of a configuration of the computer 110. Upon receiving an analysis request (an instruction to transmit the analysis execution request) from the analysis flow executor 140, the computer 110 transmits the analysis execution request to the management server 120, and presents, in the analysis flow executor 140, an analysis result received from the management server 120 as a response. The computer 110 includes a central processing unit (CPU) 210, a memory 220, a storage device 230, an input device 240, an output device 250, and a communication port 260.

The CPU 210 realizes functions of the computer 110 by reading programs and the like stored in the storage device 230 to the memory 220 and executing the programs. The input device 240 is a pointing device, a keyboard, or the like, which receives an instruction or the like from the analysis flow executor 140 to transmit an analysis execution request. The output device 250 is a display or the like, which displays an analysis result and the like received from the management server 120. The communication port 260 is a network interface card or the like, which is communicably connected to the management server 120.

FIG. 3 shows an example of a configuration of the management server 120. The management server 120 analyzes the analysis execution request from the computer 110, determines a timing to delete (erase) intermediate data, performs an analysis, deletes the intermediate data at the determined timing, and transmits an analysis result to the computer 110. The management server 120 includes a CPU 310, a memory 320, a storage device 330, an input device 340, an output device 350, and a communication port 360.

The storage device 330 includes a flow information acquisition program 370, a task query analysis program 371, a constraint determination program 372, a flow generation program 373, a flow execution program 374, a flow information management table 375, a task management table 376, a blacklist management table 377, a constraint rule management table 378, and a flow management table 379. Functions of the management server 120 (flow information acquisition unit, task query analysis unit, constraint determination unit, flow generation unit, flow execution unit, and the like) are realized when the programs and the management tables of the storage device 330 are loaded into the memory 320 by the CPU 310.

The input device 340 is a pointing device, a keyboard, or the like, which inputs various types of information. The output device 350 is a display or the like, which outputs various types of information. The communication port 360 is a network interface card or the like, which is communicably connected to the computer 110.

(Configuration of Management Table)

FIG. 4 shows an example of the flow information management table 375. The flow information management table 375 includes: a column for a task ID 410 that stores task identification information capable of uniquely identifying a task; a column for an input source 420 that stores input source identification information capable of identifying an input source of input data; a column for an input data 430 that stores input item information indicating an item of the input data; and a column for a query 440 that stores a query to be executed by the task. In the example, the query represents processing content of a database by a character string, and is, for example, a structured query language (SQL) statement.

FIG. 5 shows an example of the task management table 376. The task management table 376 includes: a column for a task ID 510 that stores task identification information capable of uniquely identifying a task; a column for an input source 520 that stores input source identification information capable of identifying an input source of input data; a column for an input data 530 that stores input item information indicating an item of the input data; a column for intermediate data 540 that stores intermediate item information indicating an item of the intermediate data (output data in a task); and an intermediate data ID 550 that stores intermediate data identification information uniquely indicating the intermediate data.

FIG. 6 shows an example of the blacklist management table 377. The blacklist management table 377 includes a column for an ID 610 that stores attribute identification information capable of uniquely identifying an attribute belonging to a blacklist (for example, an attribute (item) of input data which is determined to have a high security level); and a column for an attribute 620 that stores attribute information indicating the attribute. The blacklist management table 377 is an example of deletion target information which defines attribute information of intermediate data to be deleted.

FIG. 7 shows an example of the constraint rule management table 378. The constraint rule management table 378 includes a column for an intermediate data ID 710 that stores intermediate data identification information capable of uniquely identifying intermediate data; and a column for a countermeasure 720 that stores countermeasure information (deletion identification information indicating whether to delete the intermediate data) indicating a countermeasure of the intermediate data. The constraint rule management table 378 is an example of constraint information that determines whether to delete intermediate data.

FIG. 8 shows an example of the flow management table 379. The flow management table 379 includes a column for an ID 810 that stores task identification information capable of uniquely identifying a task; and a column for a task 820 that stores task information indicating content of a task (for example, "task 1" indicates execution of a query of task 1, and "intermediate data 1 deletion" indicates execution of a deletion query that deletes intermediate data 1).

(Data Analysis Processing (Data Management Method in Data Analysis System))

In a data analysis processing, a series of processings (flow information acquisition processing, task query analysis processing, constraint determination processing, flow generation processing, and flow execution processing) are performed in order to perform data analysis in response to an analysis execution request from the computer 110 and to transmit an analysis result to the computer 110. The data analysis processing will be described in detail with reference to FIGS. 9 to 13.

FIG. 9 shows processing procedures of a flow information acquisition processing performed by the flow information acquisition unit (flow information acquisition program 370). The flow information acquisition unit receives an analysis execution request from the computer 110, analyzes content of the analysis execution request, and stores the content in the flow information management table 375.

First, the flow information acquisition unit receives an analysis execution request from the computer 110 (step S910).

Subsequently, the flow information acquisition unit analyzes the analysis execution request, decomposes a query or the like for each task, and stores the query in the flow information management table 375 (step S920). More specifically, the flow information acquisition unit stores a task ID included in the analysis execution request in the task ID 410 of the flow information management table 375; stores an input source name of input data in the input source 420 of the flow information management table 375; stores an input data item obtained by analyzing a query in the input data 430 of the flow information management table 375; and stores the query in the query 440 of the flow information management table 375.

The flow information acquisition processing in the flow information acquisition unit is described above.

FIG. 10 shows processing procedures of a task query analysis processing performed by the task query analysis unit (task query analysis program 371). The task query analysis unit analyzes a query, and clarifies a relationship between input data and output data in one task (query).

First, the task query analysis unit determines whether there is an unfinished processing in a task held in the flow information management table 375 (step S1010). When the task query analysis unit determines that there is an unfinished processing, the processing proceeds to step S1020.

When the task query analysis unit determines that there is no unfinished processing, the task query analysis processing is ended.

In step S1020, the task query analysis unit analyzes a task to be processed in the column for the query 440 in the flow information management table 375, and grasps a relationship between input data and output data (for example, specifies input data and output data for each task).

Subsequently, the task query analysis unit updates the task management table 376 based on a result of the analysis of the task to be processed (step S1030), and the processing proceeds to step S1010. More specifically, the task query analysis unit records the task ID 410 of the task to be processed in the flow information management table 375 in the column of the task ID 510 of the task management table; records an intermediate data ID in the column for the input source 520 of the task management table when the input source 420 of the task to be processed in the flow information management table 375 or intermediate data grasped in step S1020 becomes an input source; records an item of the intermediate data in the column for the input data 530 of the task management table when the input data 430 of the task to be processed in the flow information management table 375 or the intermediate data grasped in step S1020 becomes the input source; and records an item of output data grasped in step S1020 in the column for the intermediate data 540 of the task management table; and records the IDs in sequential numbers in the column for the intermediate data ID 550 of the task management table.

The task query analysis processing in the task query analysis unit is described above.

FIG. 11 shows processing procedures of a constraint determination processing performed by the constraint determination unit (constraint determination program 372). The constraint determination unit determines whether to delete or leave intermediate data generated in each task, and generates a constraint rule management table 378.

First, the constraint determination unit determines whether there is an unfinished processing in intermediate data included in the task management table 376 (step S1110). When the constraint determination unit determines that there is an unfinished processing, the processing proceeds to step S1120. When the constraint determination unit determines that there is no unfinished processing, the constraint determination processing is ended.

In step S1120, the constraint determination unit determines whether the intermediate data 540 of intermediate data to be processed in the task management table 376 includes pieces in a number equal to or more than a predetermined threshold value (predetermined number or more) of pieces of the attributes 620 of the blacklist management table 377 (step S1120). When the constraint determination unit determines that the number of pieces included is equal to or more than the threshold value, the process proceeds to step S1130. When the constraint determination unit determines that the number of pieces included is not equal to or more than the threshold value, the process proceeds to step S1140. The predetermined number may be "1" or "2" or more (a plurality).

In step S1130, the constraint determination unit records the intermediate data ID 550 of the intermediate data to be processed in the task management table 376 in the intermediate data ID 710 of the constraint rule management table 378, and records "delete" in the column for the countermeasure 720 of the constraint rule management table 378, then the processing proceeds to step S1110.

In step S1140, the constraint determination unit records the intermediate data ID 550 of the intermediate data to be processed in the task management table 376 in the intermediate data ID 710 of the constraint rule management table 378, and records "leave" in the column for the countermeasure 720 of the constraint rule management table 378, then the processing proceeds to step S1110.

The constraint determination processing in the constraint determination unit is described above.

FIG. 12 shows processing procedures of a flow generation processing performed by the flow generation unit (flow generation program 373). The flow generation unit generates a flow that actually executes a task based on information of the constraint rule management table 378. At this time, a timing of deleting intermediate data is defined (determined).

First, the flow generation unit determines whether there is an unfinished processing in a task in the task management table 376 (step S1210). When the flow generation unit determines that there is an unfinished processing, the processing proceeds to step S1220. When the flow generation unit determines that there is no unfinished processing, the processing proceeds to step S1250.

In step S1220, the flow generation unit adds the task to be processed in the task management table 376 to the column for the task 820 in the flow management table 379, and the columns for the ID 810 are provided in sequence.

Subsequently, the flow generation unit retrieves the intermediate data ID, recorded in the input source 520 of the task to be processed in the task management table 376, in the column for the intermediate data ID 710 of the constraint rule management table 378, and confirms the column of the countermeasure 720 of the record (step S1230). When a value in the column for the countermeasure 720 of the record is "delete", the flow generation unit moves the processing to step S1240. When the value in the column for the countermeasure 720 of the record is "leave" or the value recorded in the input source 520 is not an intermediate data ID ("company A", "company B", or the like), the flow generation unit moves the processing to step S1210.

In step S1240, the flow generation unit adds a task (deletion task), that deletes the intermediate data recorded in the input source 520 of the task to be processed in the task management table 376, to the column for the task 820 in the flow management table 379, and the columns for the ID 810 are provided in sequence, then the processing proceeds to step S1210.

In step S1250, the flow generation unit adds a task of deleting all the intermediate data to the column for the task 820 in the flow management table 379, and the columns for the ID 810 are provided in sequence, then the flow generation processing is ended.

The above is a description of the flow generation processing in the flow generation unit.

FIG. 13 shows processing procedures of a flow execution processing performed by the flow execution unit (flow execution program 374). The flow execution unit executes a task in accordance with the flow defined in the flow management table 379.

First, the flow execution unit determines whether there is an unfinished processing in a task in the flow management table 379 (step S1310). When the flow execution unit determines that there is an unfinished processing, the processing proceeds to step S1320. When the flow execution unit determines that there is no unfinished processing, the processing proceeds to step S1330.

In step S1320, the flow execution unit executes the task to be processed recorded in the column for the task 820 in the flow management table 379, and the processing proceeds to step S1310.

In step S1330, the flow execution unit transmits (notifies) an analysis result to the computer 110, and ends the flow execution processing. The analysis result is output by the output device 250 in the computer 110.

The flow execution processing in the flow execution unit is described above.

As described above, according to the present embodiment, when data including an attribute listed on a blacklist is generated as intermediate data, the intermediate data can be deleted immediately after use, which can reduce security risk. In addition, intermediate data having no security risk can be held until an end of a flow, and can be quickly re-executed when a failure occurs in a task.

(2) Second Embodiment

A configuration of a second embodiment is basically the same as the configuration of the first embodiment. However, the configuration of the constraint rule management table 378 stored in the storage device 330 of the management server 120 is different. In addition, the constraint determination program 372 and the flow generation program 373 stored in the storage device 330 of the management server 120 are different. Details will be described below.

FIG. 14 shows an example of the constraint rule management table 378. The constraint rule management table 378 includes a column for an intermediate data ID 1410 that stores intermediate data identification information capable of uniquely identifying intermediate data; and a column for a final use task 1420 that stores final use task information indicating a task that finally uses the intermediate data indicated by the intermediate data ID.

FIG. 15 shows processing procedures of a constraint determination processing performed by the constraint determination unit (constraint determination program 372). The constraint determination unit specifies a task that uses intermediate data finally, and generates the constraint rule management table 378.

First, the constraint determination unit determines whether there is an unfinished processing in intermediate data included in the task management table 376 (step S1510). When the constraint determination unit determines that there is an unfinished processing, the processing proceeds to step S1520. When the constraint determination unit determines that there is no unfinished processing, the constraint determination processing is ended.

In step S1520, the constraint determination unit records the task ID 510 of a task, whose column for input source 520 in the task management table 376 is finally filled with the intermediate data ID 550 of the intermediate data to be processed in the task management table 376, in the column for the final use task 1420 of the constraint rule management table 378, then the processing proceeds to step S1510.

The constraint determination processing in the constraint determination unit is described above.

FIG. 16 shows processing procedures of a flow generation processing performed by the flow generation unit (flow generation program 373). The flow generation unit generates a flow that actually executes a task based on information of the constraint rule management table 378. At this time, a timing of deleting intermediate data is determined.

First, the flow generation unit determines whether there is an unfinished processing in a task in the task management table 376 (step S1610). When the flow generation unit determines that there is an unfinished processing, the processing proceeds to step S1620. When the flow generation unit determines that there is no unfinished processing, the processing proceeds to step S1660.

In step S1620, the flow generation unit records the task to be processed in the task management table 376 to the column for the task 820 in the flow management table 379, and the columns for the ID 810 are provided in sequence.

Subsequently, the flow generation unit retrieves the constraint rule management table 378 with the intermediate data ID recorded in the input source 520 of the task to be processed in the task management table 376 (step S1630). Subsequently, the flow generation unit determines whether the task to be processed (task ID) is a final use task (step S1640). When the flow generation unit determines that the task is the final use task, the processing proceeds to step S1650. When the flow generation unit determines that the task is not the final use task or the value recorded in the input source 520 is not an intermediate data ID, the processing proceeds to step S1610.

In step S1650, the flow generation unit adds a task (deletion task), that deletes the intermediate data recorded in the input source 520 of the task to be processed in the task management table 376, to the column for the task 820 in the flow management table 379, and the columns for the ID 810 are provided in sequence, then the processing proceeds to step S1610.

In step S1660, the flow generation unit adds a task of deleting all the intermediate data to the column for the task 820 in the flow management table 379, and the columns for the ID 810 are provided in sequence, then the flow generation processing is ended.

The above is a description of the flow generation processing in the flow generation unit. The flow execution processing shown in FIG. 13 is continuously performed, but description thereof is omitted since the processing is the same as the first embodiment.

As described above, according to the embodiment, a situation, in which intermediate data is held until an end of a flow so that the intermediate data is attacked, can be avoided by deleting useless intermediate data immediately after use after execution of a task, which can reduce security risk.

(3) Third Embodiment

A configuration of a third embodiment is basically the same as the configuration of the first embodiment. However, the configuration of the constraint rule management table 378 stored in the storage device 330 of the management server 120 is different. In addition, an intermediate data generation time threshold value management table 1800 and a task execution time management table 1900 are newly stored in the storage device 330 of the management server 120. In addition, the constraint determination program 372, the flow generation program 373, and the flow execution program 374 stored in the storage device 330 of the management server 120 are different.

FIG. 17 shows an example of the constraint rule management table 378. The constraint rule management table 378 includes a column for an intermediate data ID 1710 that stores intermediate data identification information capable of uniquely identifying intermediate data; a column for a generation time 1720 that stores generation time information indicating a time related to generation of the intermediate data; and a column for a countermeasure 1730 that stores countermeasure information indicating a countermeasure of the intermediate data.

FIG. 18 shows an example of the intermediate data generation time threshold value management table 1800. The intermediate data generation time threshold value management table 1800 includes a column for a threshold value 1810 that stores the threshold value.

FIG. 19 shows an example of the task execution time management table 1900. The task execution time management table 1900 includes an ID 1910 that stores identification information capable of uniquely identifying a time required for execution of a task (query); a column for an execution time 1920 that stores execution time information indicating the time required for the execution of the task; and a column for a query 1930 that stores a query executed in the task.

FIG. 20 shows processing procedures of a constraint determination processing performed by the constraint determination unit (constraint determination program 372). The constraint determination unit determines whether to delete or leave intermediate data from a generation time of the intermediate data and a threshold value, and generates the constraint rule management table 378.

First, the constraint determination unit determines whether there is an unfinished processing in intermediate data included in the task management table 376 (step S2010). When the constraint determination unit determines that there is an unfinished processing, the processing proceeds to step S2020. When the constraint determination unit determines that there is no unfinished processing, the constraint determination processing is ended.

In step S2020, the constraint determination unit retrieves the query 440 of the task of the intermediate data to be processed in the column of the query 1930 in the execution time management table 1900, and records a value recorded in the execution time 1920 in the generation time 1720 of the constraint rule management table 378.

Subsequently, the constraint determination unit determines whether there is a value in the generation time 1720 of the intermediate data to be processed in the constraint rule management table 378 (step S2030). When the constraint determination unit determines that there is a value, the processing proceeds to step S2040. When the constraint determination unit determines that there is no value, the processing proceeds to step S2070.

In step S2040, the constraint determination unit compares the value of the generation time 1720 of the intermediate data to be processed in the constraint rule management table 378 with the value of the threshold 1810 in the intermediate data generation time threshold value management table 1800, and determines whether the generation time is shorter than the threshold value. When the constraint determination unit determines that the generation time is shorter, the processing proceeds to step S2050. When the constraint determination unit determines that the generation time is not shorter, the processing proceeds to step S2060.

In step S2050, the constraint determination unit records "delete" in the column for the countermeasure 1730 of the intermediate data to be processed in the constraint rule management table 378, then the processing proceeds to step S2010.

In step S2060, the constraint determination unit records "leave" in the column for the countermeasure 1730 of the intermediate data to be processed in the constraint rule management table 378, then the processing proceeds to step S2010.

In step S2070, the constraint determination unit records "leave" in the column for the countermeasure 1730 of the intermediate data to be processed in the constraint rule management table 378, then the processing proceeds to step S2010.

The constraint determination processing in the constraint determination unit is described above.

FIG. 21 shows processing procedures of a flow generation processing performed by the flow generation unit (flow generation program 373). The flow generation unit generates a flow that actually executes a task based on information of the constraint rule management table 378. At this time, a timing of deleting intermediate data is determined.

First, the flow generation unit determines whether there is an unfinished processing in a task in the task management table 376 (step S2110). When the flow generation unit determines that there is an unfinished processing, the processing proceeds to step S2120. When the flow generation unit determines that there is no unfinished processing, the processing proceeds to step S2150.

In step S2120, the flow generation unit adds the task to be processed in the task management table 376 to the column for the task 820 in the flow management table 379, and the columns for the ID 810 are provided in sequence.

Subsequently, the flow generation unit retrieves the intermediate data ID, recorded in the input source 520 of the task to be processed in the task management table 376, in the column for the intermediate data ID 1710 in the constraint rule management table 378, and confirms the column for the countermeasure 1730 of the record (step S2130). When a value in the column for the countermeasure 1730 of the record is "delete", the flow generation unit moves the processing to step S2140. When the value in the column for the countermeasure 1730 of the record is "leave" or the value recorded in the input source 520 is not an intermediate data ID, the flow generation unit moves the processing to step S2110.

In step S2140, the flow generation unit adds a task (deletion task) that deletes the intermediate data recorded in the input source 520 of the task to be processed in the task management table 376 to the column for the task 820 in the flow management table 379, and the columns for the ID 810 are provided in sequence, then the processing proceeds to step S2110.

In step S2150, the flow generation unit adds a task of deleting all the intermediate data to the column for the task 820 in the flow management table 379, and the columns for the ID 810 are provided in sequence, then the flow generation processing is ended.

The above is a description of the flow generation processing in the flow generation unit.

FIG. 22 shows processing procedures of a flow execution processing performed by the flow execution unit (flow execution program 374). The flow execution unit executes a task in accordance with the flow defined in the flow management table 379.

First, the flow execution unit determines whether there is an unfinished processing in a task in the flow management table 379 (step S2210). When the flow execution unit determines that there is an unfinished processing, the processing proceeds to step S2220. When the flow execution unit determines that there is no unfinished processing, the processing proceeds to step S2240.

In step S2220, the flow execution unit executes the task to be processed recorded in the column for the task 820 in the flow management table 379.

Subsequently, the flow execution unit confirms whether there is a query 1930 of the task execution time management table 1900 that stores a query matching a query of the task to be processed. When there is such a query, the flow execution unit updates the task execution time in the column for the execution time 1920 corresponding to the query 1930. When there is no such query, a record is added (the columns for the ID 1910 are provided in sequence; execution time of the task to be processed is stored in the execution time 1920; and the query of the task to be processed is stored in the query 1930), then the processing proceeds to step S2210 (step S2230).

In step S2240, the flow execution unit transmits (notifies) an analysis result to the computer 110, and ends the flow execution processing. The analysis result is output by the output device 250 in the computer 110.

The flow execution processing in the flow execution unit is described above.

As described above, according to the embodiment, a situation, in which intermediate data is held until an end of a flow so that the intermediate data is attacked, can be avoided by deleting intermediate data that takes less time to generate, which can reduce security risk. In addition, since intermediate data requiring longer time to generate is held, re-execution can be performed quickly when a failure occurs in a task.

(4) Other Embodiments

In the first to third embodiments described above, the invention is applied to the data analysis system 1, but the invention is not limited thereto, and can be widely applied to various other computer systems.

In the first to third embodiments described above, the embodiments are described separately, but the invention is not limited thereto, and the first to third embodiments may be appropriately combined.

For example, the configuration of the first embodiment and the configuration of the second embodiment may be combined. In this case, for example, whether intermediate data generated by a final use task includes a number of pieces equal to or more than a threshold value of pieces of attributes included in a blacklist management table may be determined after determining the final use task of the intermediate data, so as to generate a constraint rule management table. According to this configuration, for example, since intermediate data having security risk can be deleted while intermediate data having no security risk can be held when the intermediate data is not used, security risk can be reduced, and the intermediate data can be quickly re-executed when a failure occurs in a task.

For example, the configuration of the first embodiment and the configuration of the third embodiment may be combined. In this case, for example, a countermeasure (to leave or to delete) may be determined for each piece of intermediate data based on a generation time and a threshold value, then it may be further determined whether intermediate data determined to be left includes pieces in a number equal to or more than a threshold value of pieces of attributes included in a blacklist management table. When the left intermediate data is determined to have the number of more pieces of the attributes, the countermeasure may be changed to "delete", and a constraint rule management table may be generated. According to this configuration, for example, even for intermediate data requiring longer time to generate, the data with security risk can be deleted, which can reduce security risk.

For example, the configuration of the second embodiment and the configuration of the third embodiment may be combined. In this case, for example, a final use task of intermediate data may be determined, and a countermeasure (to leave or to delete) may be determined based on a generation time and a threshold value, then a constraint rule management table may be generated. According to this configuration, for example, a situation, in which intermediate data is held until an end of a flow so that the intermediate data is attacked, can be avoided, since useless intermediate data is deleted immediately after execution of a task while intermediate data having a shorter generation time is deleted, which can further reduce security risk.

The configurations described above are merely examples, other configurations may be adopted, and any appropriate configuration can be adopted within the scope of the gist of the invention.

Although in the first embodiment described above, whether the intermediate data includes pieces in the number equal to or more than the threshold value of pieces of the attributes included in the blacklist management table 377 is determined in step S1120, the invention is not limited thereto. A weight may be provided for each attribute, and it may be determined whether a sum of weights of attributes of intermediate data included in the black list management table 377 exceeds a predetermined threshold value.

Although in the third embodiment described above, the column for the execution time 1920 is updated to a latest value in step S2230, the invention is not limited thereto. A past execution time may be stored, and the column for the execution time 1920 may be set to a representative value (average value, median value, most frequent value, or the like).

Although the execution time of the task execution time management table 1900 is used as the generation time in the third embodiment described above, the invention is not limited thereto, and a time required for actual generation may be used as the generation time. In this case, the deletion task of the intermediate data may not be added in the flow, and the generation time of the intermediate data and the threshold value may be compared with each other at the time of execution of each task of the flow (for example, after step S2220), then the intermediate data may be deleted when the generation time is shorter than the threshold value.

Further, at least following features are included in the above-described embodiments.

A data management method in a data analysis system that performs analysis by combining a plurality of input data based on an analysis execution request from a computer includes: a first step, in which a request analysis unit (for example, flow information acquisition unit, task query analysis unit, and constraint determination unit) analyzes the analysis execution request from the computer to identify a task, identifies intermediate data generated after execution of each identified task, and generates constraint information that determines whether to delete the identified intermediate data; a second step, in which a task management unit (for example, flow generation unit) determines whether to delete the intermediate data based on the constraint information for each identified task; and a third step, in which a task execution unit (for example, flow execution unit) executes the identified task and deletes the intermediate data of the task based on a determination result of the second step.

The task management unit may generate a flow for the task execution unit to execute tasks. For example, the flow is generated in a following way: a task is added to the flow, and then when it is determined, based on the constraint information, that intermediate data generated after execution of the task should be deleted, a process of adding a deletion task of deleting the intermediate data to the flow following the tasks is sequentially performed for the identified task.

REFERENCE SIGN LIST

1. Data Analysis System
110. Computer
120. Management Server
370. Flow Information Acquisition Program
371. Task Query Analysis Program
372. Constraint Determination Program
373. Flow Generation Program
374. Flow Execution Program
375. Flow Information Management Table
376. Task Management Table
377. Blacklist Management Table
378. Constraint Rule Management Table
379. Flow Management Table

The invention claimed is:

1. A data management method in a data analysis system that performs analysis by combining a plurality of input data based on an analysis execution request from a computer, comprising:
   a first step, in which a request analysis unit:
      analyzes the analysis execution request from the computer to identify a plurality of tasks, identifies intermediate data generated by execution of each identified task, and identifies attribute information included in each of the identified intermediate data, and
      records the identified plurality of tasks, identified intermediate data and identified attribute information in a task management data structure, wherein each of the identified plurality of task are associate with a respective identified intermediate data and respective attribute information;
      identifies deletion target information data structure which defines blacklist information to be deleted;
      compares the attribute information for each identified intermediate data of the task management data structure with the blacklist information of the deletion target data structure, and determines whether a number of pieces of attribute information of each of the identified intermediate data is equal to or greater than a threshold number of pieces of the blacklist information;
      generates constraint information that determines whether to delete each of the identified intermediate data based on the comparison, the constraint information comprising countermeasure information for each of the identified intermediate data,
      wherein, for each of the identified intermediate data:
         the countermeasure information is set to delete in response to the number of pieces of attribute information of the respective identified intermediate data being equal to or greater than the threshold number of pieces of the blacklist information; and
         the countermeasure information is set to leave in response to the number of pieces of attribute information of the respective identified intermediate data being less than the threshold number of pieces of the blacklist information;

a second step, in which a task management unit determines whether to delete or leave each of the identified intermediate data from the constraint information for each identified task; and a third step, in which a task execution unit executes each of the identified tasks and deletes or leaves intermediate data of each task based on a determination result of the second step.

2. The data management method according to claim 1, wherein the task management unit generates a flow for the task execution unit to execute the plurality of tasks, the flow being generated in a following way, for each task of the plurality of tasks: a task is added to the flow, and then when it is determined, based on the constraint information, that intermediate data generated by execution of the added task includes a number of pieces of the attribute information equal to or greater than the threshold number of pieces of attribute information, a deletion task, for deleting the intermediate data, is added to the flow to be sequentially performed following the added task, and the task execution unit executes the plurality of tasks in accordance with the generated flow.

3. The data management method according to claim 1, wherein the request analysis unit includes, in the constraint information, information indicating a task in which identified intermediate data are finally used, and the task management unit determines to delete the intermediate data when it is determined that the intermediate data generated after execution of an identified task are finally used based on the constraint information.

4. The data management method according to claim 3, wherein the task management unit generates a flow for the task execution unit to execute the plurality of tasks, the flow being generated in a following way, for each of the plurality of tasks: a task is added to the flow, and then when it is determined, based on the constraint information, that intermediate data generated after execution of the added task are finally used, a deletion task, for deleting the intermediate data generated by execution of the added task, is added to the flow to be sequentially performed following the added task, and the task execution unit executes the tasks in accordance with the generated flow.

5. The data management method according to claim 1, wherein the request analysis unit includes, in the constraint information, an analysis result of whether a generation time associated with identified intermediate data is shorter than a predetermined threshold value, and the task management unit determines to delete the intermediate data, when it is determined, based on the constraint information, that the generation time associated with the identified intermediate data is shorter than the threshold value.

6. The data management method according to claim 5, wherein the task management unit generates a flow for the task execution unit to execute the plurality of tasks, the flow being generated in a following way, for each of the plurality of tasks: a task is added to the flow, and then when it is determined, based on the constraint information, that the generation time associated with intermediate data generated after execution of the added task is shorter than the threshold value, a deletion task, for deleting the intermediate data generated by execution of the added task, is added to the flow to be sequentially performed following the added task, and the task execution unit executes the tasks in accordance with the flow.

7. The data management method according to claim 1, further comprising:

a fourth step, in which the task execution unit deletes all intermediate data which are not deleted after execution of all the tasks of the analysis execution request;

a fifth step, in which the task execution unit transmits a result of executing all the tasks of the analysis execution request to the computer as an execution result of the analysis execution request; and a sixth step, in which the computer outputs the received execution result of the analysis execution request.

8. A data analysis system that performs analysis by combining a plurality of input data based on an analysis execution request from a computer, comprising:

a storage device configured to store a program; and a central processing unit (CPU) configured to execute the program stored in the storage device to:

analyze the analysis execution request from the computer to identify a plurality of tasks;

identify intermediate data generated after execution of each identified task;

identify attribute information included in each of the identified intermediate data;

record the identified plurality of tasks, identified intermediate data and identified attribute information in a task management data structure, wherein each of the identified plurality of task are associate with a respective identified intermediate data and respective attribute information;

identify deletion target information which defines blacklist information to be deleted, compare the attribute information for each identified intermediate data of the task management data structure with the blacklist information of the deletion target data structure, and determine whether a number of pieces of attribute information of each of the identified intermediate data is equal to or greater than a threshold number of pieces of the blacklist information;

generate constraint information that determines whether to delete each of the identified intermediate data based on the comparison, the constrain information comprising countermeasure information for each of the identified intermediate data;

wherein, for each of the identified intermediate data, the countermeasure information is set to delete in response to the number of pieces of attribute information of the respective identified intermediate data being equal to or greater than the threshold number of pieces of the blacklist information; and the countermeasure information is set to leave in response to the number of pieces of attribute information of the respective identified intermediate data being less than the threshold number of pieces of the blacklist information;

determine whether to delete the intermediate data based on the constraint information for each identified task; and execute the identified task and deletes the intermediate data of the task based on a determination result of the task management unit.

\* \* \* \* \*